March 11, 1952 R. D. McLEOD 2,588,552
PILOT VALVE
Filed Dec. 7, 1946
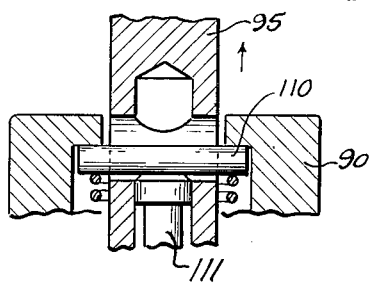
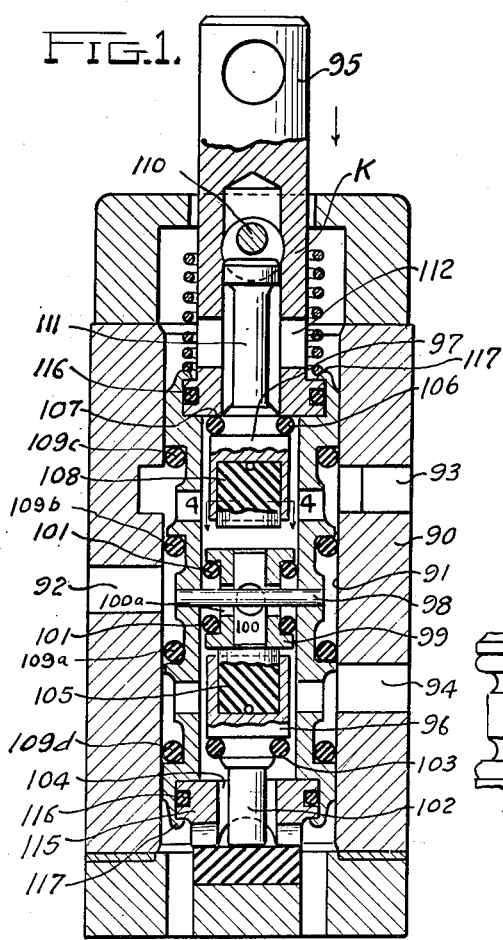
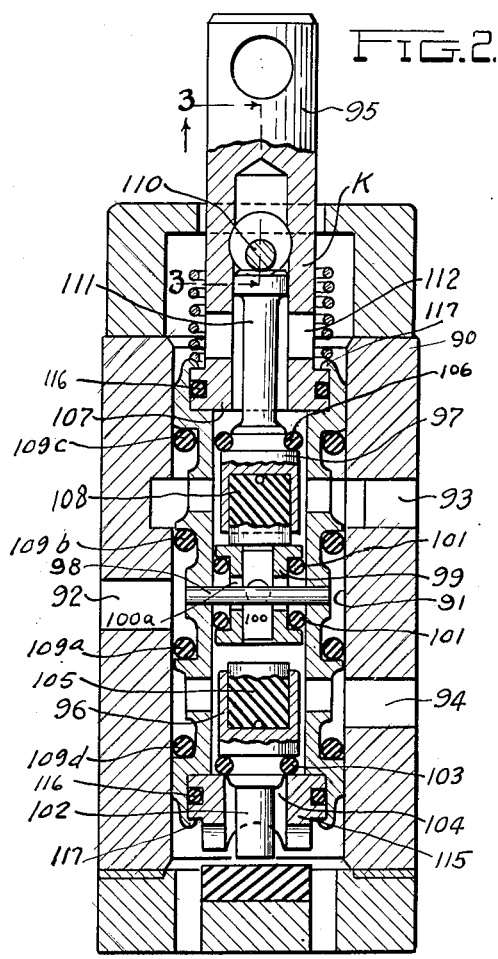
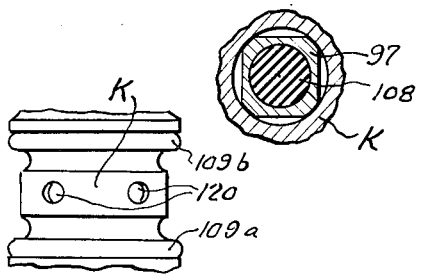
INVENTOR.
Roy D. McLeod
BY Barnes, Kisselle,
Laughlin & Raisch
ATTORNEYS Patented Mar. 11, 1952

2,588,552

UNITED STATES PATENT OFFICE 2,588,552

PILOT VALVE

Roy D. McLeod, Detroit, Mich., assignor of two-thirds to William Carls, Milford, Mich., and one-third to Sophia Louise Brussel and Detroit Trust Company, coexecutors of Fred H. Brussel, deceased Application December 7, 1946, Serial No. 714,736

7 Claims. (Cl. 277—20)

This invention relates to a pilot valve.

It is an object of the invention to provide an air distributing valve especially adapted for control purposes for directing air to and from operating ports.

It is particularly an object of the present invention to provide a valve which has an extremely short operating stroke and is, consequently, adapted to solenoid control.

It is a further object to provide a valve which has parts so arranged that they are air operated to permit extremely rapid action.

Other objects and features of the construction will be evident in the following description and claims.

In the drawings:

Figure 1 is a longitudinal section showing the operating parts in one position.

Figure 2 is a similar section showing the operating parts in another position.

Figure 3 is a partial section on line 3—3 of Figure 2.

Figure 4 is a sectional view on line 4—4 of Figure 1.

Figure 5 is a partial elevation of the central portion of the sliding valve.

The valve to be described is indicated generally at K and will be operated preferably by a solenoid, although manual operation is entirely feasible. The valve is slidable in a housing 90 which has a straight cylindrical bore 91 with a side pressure inlet opening 92 and two operating ports 93 and 94.

A valve spool having suitable guiding lands is fitted in the bore 91 and is provided with a central bore extending from the bottom upward into the operating stem 95. Within the central bore of valve K are two square-sectioned plungers 96 and 97 (Figure 4), one at each end of the bore, and between them, mounted with lost motion on a pin 98, is a small spool 99 provided with an axial passage 100 and side ports 100a. Neoprene rings 101 serve to provide a sliding seal around the spool 99. A stem 102 on the bottom of plunger 96 limits its downward movement and consequently when valve K is shifted downwardly as shown in Figure 1, a neoprene ring 103 is lifted away from a port opening 104 and a neoprene insert 105 may contact the lower end of spool 99 to close the axial passage 100. Meanwhile, with the valve K in its down position, the stem 111 on plunger 97 is freed to permit neoprene ring 106 to shift against a seat 107 in a manner to be later described to close the top axial passage. A neoprene insert 108 in plunger 97 is thus spaced from the upper end of passage 100 in spool 99 permitting pilot air to pass from an inlet 92 through side ports in valve K between neoprene rings 109a and 109b and through side ports in spool 99 between rings 101 to an operating outlet 93. Ring 109c seals the upper land of valve K.

In the reverse position when stem 95 is moved upward by the solenoid, a pin 110 shown in Figure 3 extending transversely through stem 95, serves as an upper limit stop for stem 111 on plunger 97. This moves the neoprene ring 106 away from the seat 107 and permits exhaust air to pass from port 93 around plunger 97, which has a cross section as shown at Figure 4, to an outlet port 112 in stem 95 and thence around the stem to atmosphere. Meanwhile, pilot air has entered the central passage 100 of spool 99 and passes down around plunger 96 to outlet 94, the neoprene ring 103 being seated against the port opening 104. Ring 109d seals the lower land of valve K.

Actually, in operation, the pressure from the inlet port 92 accomplishes the sealing between the stems 96 and 97 and the respective ends of spool 99. The shifting of the stem 95 opens either port 104 or port 107. The rush of air under pressure toward such open port immediately tends to force the spool 99 against the particular plunger which is held open, and the other plunger is forced by pressure to a closed position. Thus the mechanical movement simply serves to open one plunger and the air does the rest of the operating of the valve. This makes for the very rapid change of part position which is possible when the solenoid is operated at hundreds of cycles a minute. Furthermore, valve K need be moved only a fraction of an inch to be effective. Consequently the solenoid travel is small. A distance of ⅛" or less is sufficient.

It will be noticed that the valve K is formed of a center portion, one end of which is blocked by the stem 95 ending in seat 107 and the other end of which is closed by a ring 115 forming seat 104; a sealing ring 116 is provided at each end of the valve and the ends of the center portion are spun over at 117 to unify the assembly. The center portion of the valve K between sealing rings 109a and 109b has side openings which are designated 120 in Figure 5. These do not show in Figures 1 and 2.

The valve may be described briefly as a housing having a side inlet port and two side outlet ports, the housing being open at each end. Within the housing is a valve spool slidable in a bore of the housing which connects with the ports. Sealing lands are formed on the spool on each side of the respective axially spaced ports. The valve spool is an open center valve, that is, it has an opening from one end to the other and each of the ports of the housing are connected to the center of the valve through side openings in the wall of the spool. The small spool 99 forms a pressure chamber within the valve having an axial passage and open to the pressure inlet 92. There are seats provided at each end of the valve spool and plungers 96 and 97 seat at the end of the valve in one position and against the pressure chamber in another position.

A spring is provided between pin 110 and valve K to hold valve K in down position. The solenoid works against this spring when it moves valve K up. Without the spring or its equivalent in a heavy solenoid plunger, air in the valve has a tendency to shift the parts. The moving air chamber furnished by spool 99 is provided to permit manufacturing tolerances so that slight errors will not interfere with valve action. This floating chamber has an additional function in that the solenoid plunger operating the stem 95 can always seat positively without interference from the valve parts. This is important in the life of a solenoid since partial or imperfect seating causes chatter and heating. A further feature of the floating chamber 99 is that the abuse on sealing faces 105 and 108 is materially lessened. The entire valve is thus given greater life by this arrangement.

What I claim is:

1. A valve comprising a housing with two side outlet ports and a side inlet port between the outlet ports, all axially spaced but connecting to a bore, a slidable open center valve spool in said bore having external lands to separate each of said ports from the other, openings formed in said spool between said lands to connect all of said ports through said open center spool, means within the spool to define a pressure area adjacent the inlet port comprising valve seats axially on either side of the openings in the spool at the inlet port, and means in said spool at each end operable in response to axial movement of said spool to close respectively the valve seats and block the pressure area from one end while opening the pressure area to the other end thus directing pressure to the side outlet ports selectively and alternately.

2. A valve comprising a housing with an inlet port between two outlet ports all axially spaced but connecting to a bore, a slidable open center valve spool in said bore having limited axial movement in the bore and provided with external lands to separate each of said ports from the other and from the ends of the bore regardless of the position of the valve, openings in the walls of said spool between the lands to connect all of said ports through said open center spool, means in each end of said spool valve operable by axial movement of the spool to open and close selectively the ends of the spool valve and to open and close the side outlet ports from the inlet port.

3. A valve comprising a housing with an inlet port between two outlet ports all axially spaced but connecting to a bore, a slidable open center valve spool in said bore having limited axial movement in the bore and provided with external lands to separate each of said ports from the other and from the ends of the bore regardless of the position of the valve, openings in the walls of said spool between the lands to connect all of said ports through said open center spool, means to form a pressure chamber within said spool between the lands defining the inlet port and open to the inlet port comprising valve seats axially on either side of the openings in the spool at the inlet port, means in each end of the valve shiftable from a position closing one end of the pressure chamber at a valve seat to a position opening that end of the chamber and closing one end of the valve spool, said last means being operable upon axial movement of the spool to connect one outlet port to the pressure chamber and the other to an open end of the valve spool.

4. A valve comprising a housing with an inlet port between two outlet ports all axially spaced but connecting to a bore, a slidable open center valve spool in said bore having limited axial movement in the bore and provided with external lands to separate each of said ports from the other and from the ends of the bore regardless of the position of the valve, openings in the walls of said spool between the lands to connect all of said ports through said open center spool, means to form a pressure chamber within said spool between the lands defining the inlet port and open to the inlet port comprising valve seats axially on either side of the openings in the spool at the inlet port, a seat at each end of the open center of the spool, means at each end of the spool to close an end seat in one position and a pressure chamber seat in another position relative to said spool, and means to shift one of said last named means off its respective end seat upon axial movement of the spool whereby to connect one outlet port with the pressure chamber and the other with an end valve seat.

5. A valve comprising a housing with an inlet port between two outlet ports all axially spaced but connecting to a bore, a slidable open center valve spool in said bore having limited axial movement in the bore and provided with external lands to separate each of said ports from the other and from the ends of the bore regardless of the position of the valve, openings in the walls of said spool between the lands to connect all of said ports through said open center spool, means to form a pressure chamber within said spool between the lands defining the inlet port and open to the inlet port comprising a seat at each end of the pressure chamber, a seat at each end of the open-center spool, means at each end of the spool pressure biased to close an end seat but shiftable alternately upon relative movement with said spool to open the respective end seat and close one end of the pressure chamber, whereby the inlet port can be connected to either of the outlet ports while the other outlet port is connected to an open end of the valve spool.

6. A valve comprising a housing with an inlet port and two outlet ports all axially spaced but connecting to a bore, a slidable open center valve spool in said bore having external lands to separate each of said ports from the other and from the ends of the bore, openings in the walls of said spool between the lands to connect all of said ports through said open center spool, means to form a pressure chamber with seats at each end of an axial passage therein within said spool between the lands defining the inlet port and open to the inlet port, said means having a limited endwise or axial motion within said spool, a seat at each end of the open-center spool leading to atmosphere, means at each end of the spool subject to pressure bias to close an end seat but shiftable upon relative movement with said spool to open the respective end seat and close one end of the pressure chamber, and a stem extending from each of said last-named means to block movement of said means in one direction relative to said housing whereby axial shifting of said spool opens one end seat and closes the pressure chamber seat adjacent that end.

7. A valve comprising a housing with an inlet port and two outlet ports all axially spaced but connecting to a bore, a slidable open center valve spool in said bore having external lands to separate each of said ports from the other and from the ends of the bore, openings in the walls of said spool between the lands to connect all of said ports through said open center spool, means to form a pressure chamber within the spool comprising an inner spool sealed at each end with respect to the inner surfaces of the valve spool and slidable in said valve spool, an axial passage through said inner spool and a valve seat at each end of said inner spool, a seat at each end of the open center valve spool leading to atmosphere, means at each end of the valve spool subject to pressure bias to close an end seat but shiftable upon relative movement with said spool to open the respective end seat and close a seat at one end of the inner spool, and a stem extending from each of said last-named means to block movement of said means in one direction relative to said housing whereby axial shifting of said spool opens one end seat and closes the pressure chamber seat adjacent that end.

ROY D. McLEOD.

REFERENCES CITED

The following references are of record in the file of this patent:

UNITED STATES PATENTS

| Number | Name | Date |
|---|---|---|
| 1,850,209 | Knox | Mar. 22, 1932 |
| 1,921,092 | Newton | Aug. 8, 1933 |
| 2,404,349 | Brant | July 23, 1946 |
| 2,424,901 | Richolt | July 29, 1947 |